(12) United States Patent
Keiper

(10) Patent No.: US 7,513,719 B2
(45) Date of Patent: Apr. 7, 2009

(54) REAMING TOOL FOR BROKEN CONDUIT

(76) Inventor: Michael C. Keiper, 8215 E. 775 North, Walkerton, IN (US) 46574

( * ) Notice: Subject to any disclaimer, the term of this patent is extended or adjusted under 35 U.S.C. 154(b) by 29 days.

(21) Appl. No.: 11/191,317

(22) Filed: Jul. 28, 2005

(65) Prior Publication Data

US 2005/0260047 A1 Nov. 24, 2005

Related U.S. Application Data

(62) Division of application No. 10/610,042, filed on Jun. 30, 2003, now Pat. No. 7,438,324.

(51) Int. Cl.
B23B 41/00 (2006.01)

(52) U.S. Cl. .......................... 408/82; 408/202; 408/233; 138/97; 285/15; 285/31; 285/332; 439/210

(58) Field of Classification Search .................. 408/79, 408/80, 81, 82, 201, 202, 231, 233, 239 R, 408/238, 227; 138/97; 285/15, 31, 39, 331, 285/332; 439/207, 210; B23B 41/00
See application file for complete search history.

(56) References Cited

U.S. PATENT DOCUMENTS

| 801,774 A | 10/1905 | DeVonshire |
| 1,332,898 A * | 3/1920 | Hossie et al. ................. 408/82 |
| 1,407,328 A * | 2/1922 | Glenzer ...................... 408/201 |
| 1,464,298 A * | 8/1923 | Stein .......................... 408/201 |
| 1,621,471 A * | 3/1927 | Simmons ................... 408/83.5 |
| 1,724,005 A * | 8/1929 | Christensen ................ 408/201 |
| 2,009,168 A * | 7/1935 | Dettmer ...................... 408/201 |
| 2,372,027 A * | 3/1945 | Smith .......................... 408/82 |
| 2,682,181 A * | 6/1954 | Toth et al. ..................... 408/82 |
| 3,028,772 A * | 4/1962 | Mossberg ..................... 408/59 |
| 3,752,593 A | 8/1973 | Fitzgerald et al. |
| 3,759,553 A | 9/1973 | Carter |
| 3,782,848 A * | 1/1974 | Pfeifer ....................... 408/156 |
| 3,976,314 A * | 8/1976 | Graham ...................... 285/238 |
| 4,063,759 A | 12/1977 | Steimle |
| 4,092,079 A | 5/1978 | Swanson |
| 4,133,312 A | 1/1979 | Burd ...................... 128/214 R |
| 4,167,363 A * | 9/1979 | Whitesel ..................... 408/201 |
| 4,246,728 A | 1/1981 | Leasher |

(Continued)

OTHER PUBLICATIONS

Genova PVC Adapter Coupling, 4" Sewerx3" Pvc-Dwv, Model 41543, http://www.usahardware.com/inet/shop/item/80420/icn/20-758243/genova/41543. hmtl (1 pg.).

(Continued)

*Primary Examiner*—David P Bryant
*Assistant Examiner*—Eric A Gates
(74) *Attorney, Agent, or Firm*—R. Tracy Crump

(57) ABSTRACT

A reaming tool for reaming a socket in a broken end portion of a cylindrical conduit enlarges the internal diameter of the broken end portion to provide a socket for receiving a male end portion on a repair coupling. The reaming tool is guided by the inner diameter of the conduit while reaming out the broken end portion to a socket diameter that is about midway between the original internal and outer diameters of the conduit.

3 Claims, 6 Drawing Sheets

U.S. PATENT DOCUMENTS

| | | | |
|---|---|---|---|
| 4,266,813 A | 5/1981 | Oliver | 285/12 |
| 4,363,505 A | 12/1982 | Smith | |
| 4,453,354 A | 6/1984 | Harbeke | 52/220 |
| 4,483,222 A | 11/1984 | Davis | |
| 4,693,643 A | 9/1987 | Heyworth | |
| 4,858,958 A | 8/1989 | Harbeke | 285/31 |
| 4,882,886 A | 11/1989 | Harbeke | |
| 4,975,001 A | 12/1990 | Rabo et al. | |
| 5,000,629 A | 3/1991 | Nygards | |
| 5,076,309 A | 12/1991 | Cornwall | |
| 5,083,820 A | 1/1992 | Hopperdietzel | |
| 5,255,945 A | 10/1993 | Toon | |
| 5,314,270 A | 5/1994 | Lavancy et al. | |
| 5,396,745 A | 3/1995 | Klein | |
| 5,401,126 A | 3/1995 | Norris et al. | |
| 5,947,655 A | 9/1999 | Ramsey | |
| 6,101,696 A * | 8/2000 | Carter | 29/90.01 |
| 6,206,618 B1 | 3/2001 | Ramsey | |
| 6,494,493 B1 | 12/2002 | Baruh | |
| 6,976,710 B1 * | 12/2005 | Bedford | 285/15 |
| 7,438,324 B2 * | 10/2008 | Keiper | 285/31 |
| 2003/0098081 A1 | 5/2003 | Tarr | |
| 2003/0121157 A1 | 7/2003 | Vatter | |
| 2005/0262688 A1 * | 12/2005 | Keiper | 29/857 |
| 2007/0210575 A1 * | 9/2007 | Keiper | 285/31 |

OTHER PUBLICATIONS

WholeSale Industrial Supply Pipe Reducer Coupling PVC 3×1½ In, http://secure2.data-comm.com/servlet/RBIS/-strse-48087/Pipe-Reducer-Coupling-PVC/Detail (2 pp.).

White PVC sch40 plumbing fittings, http://www.plumbingsupply.com/pvc.html (33 pp.).

* cited by examiner

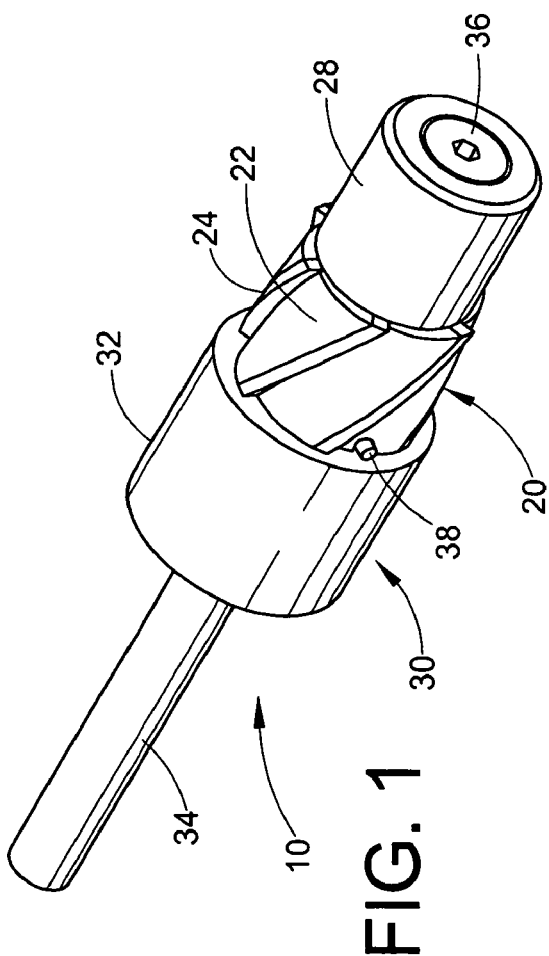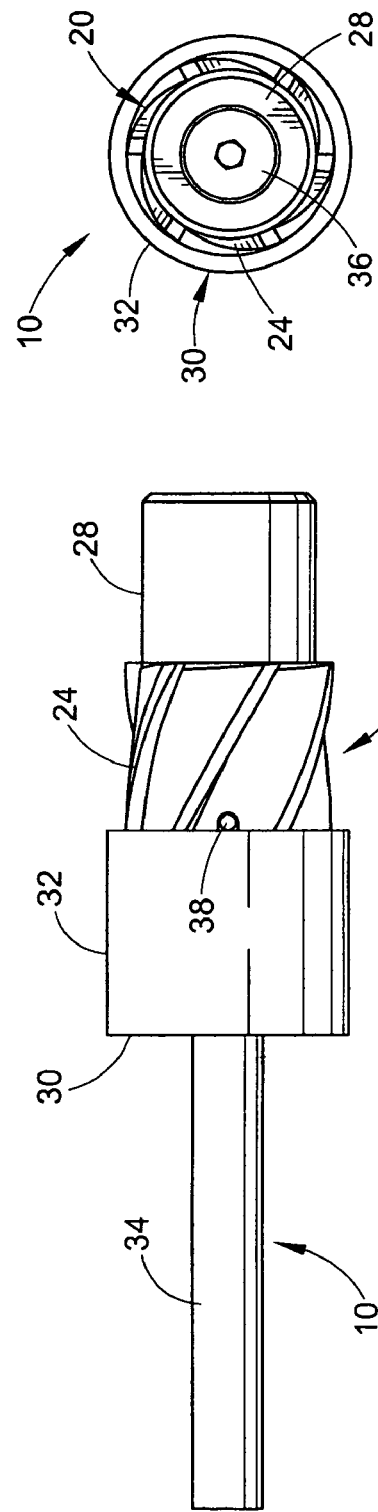

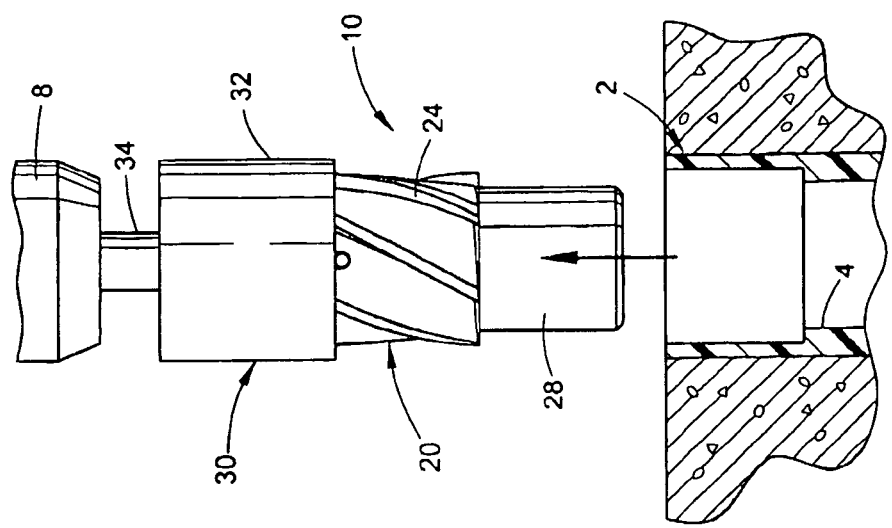
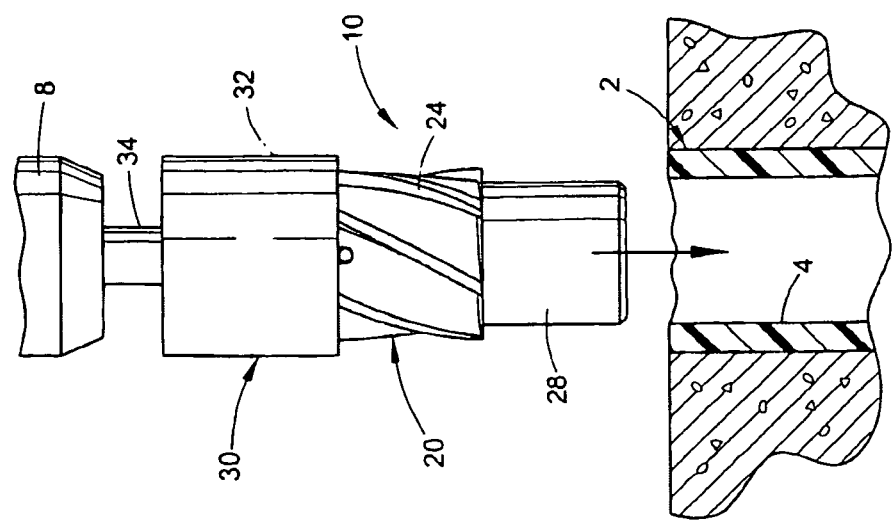

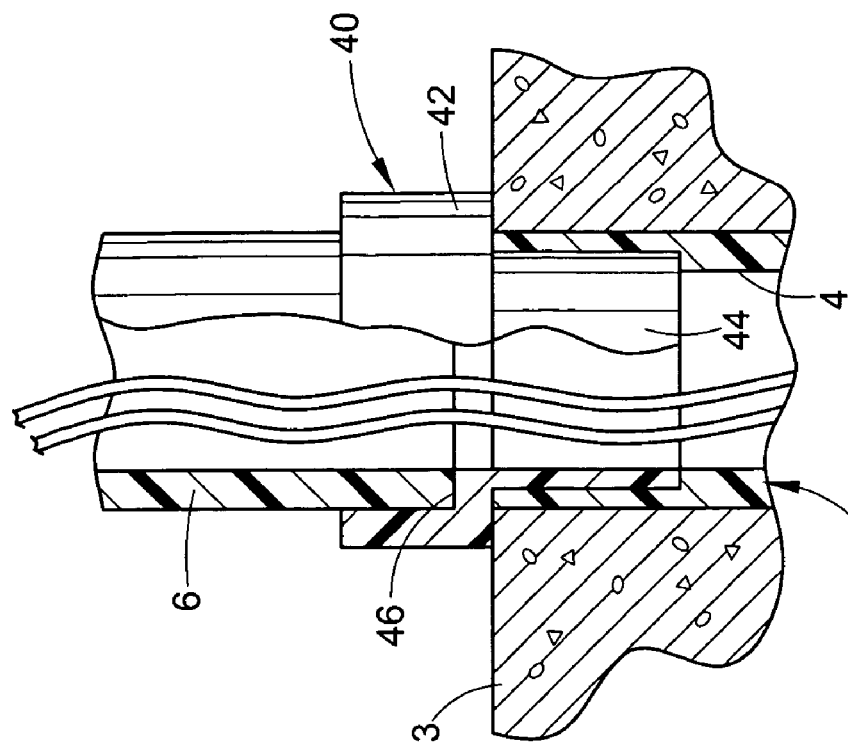
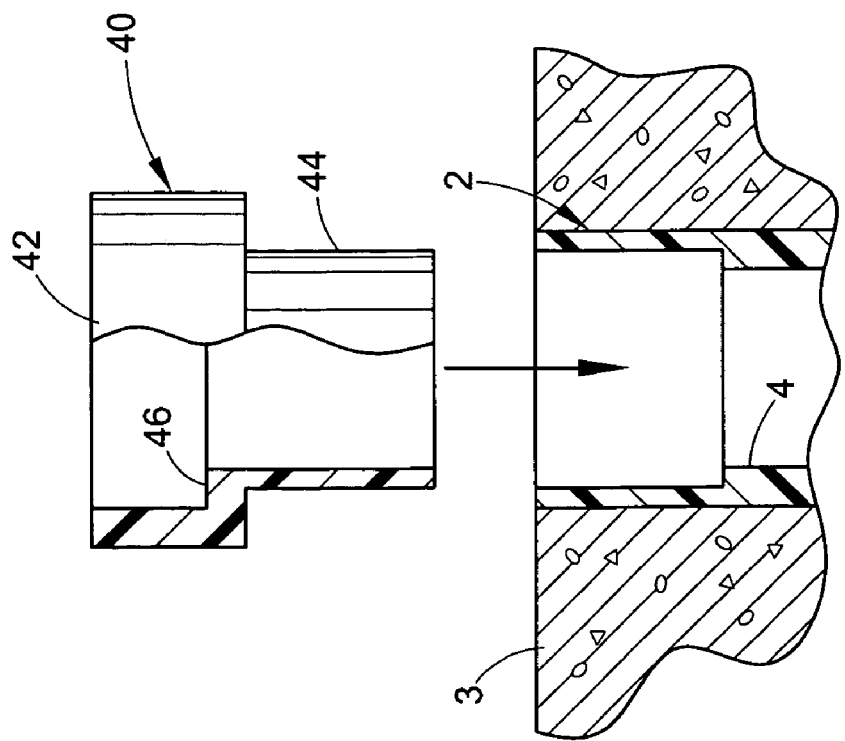

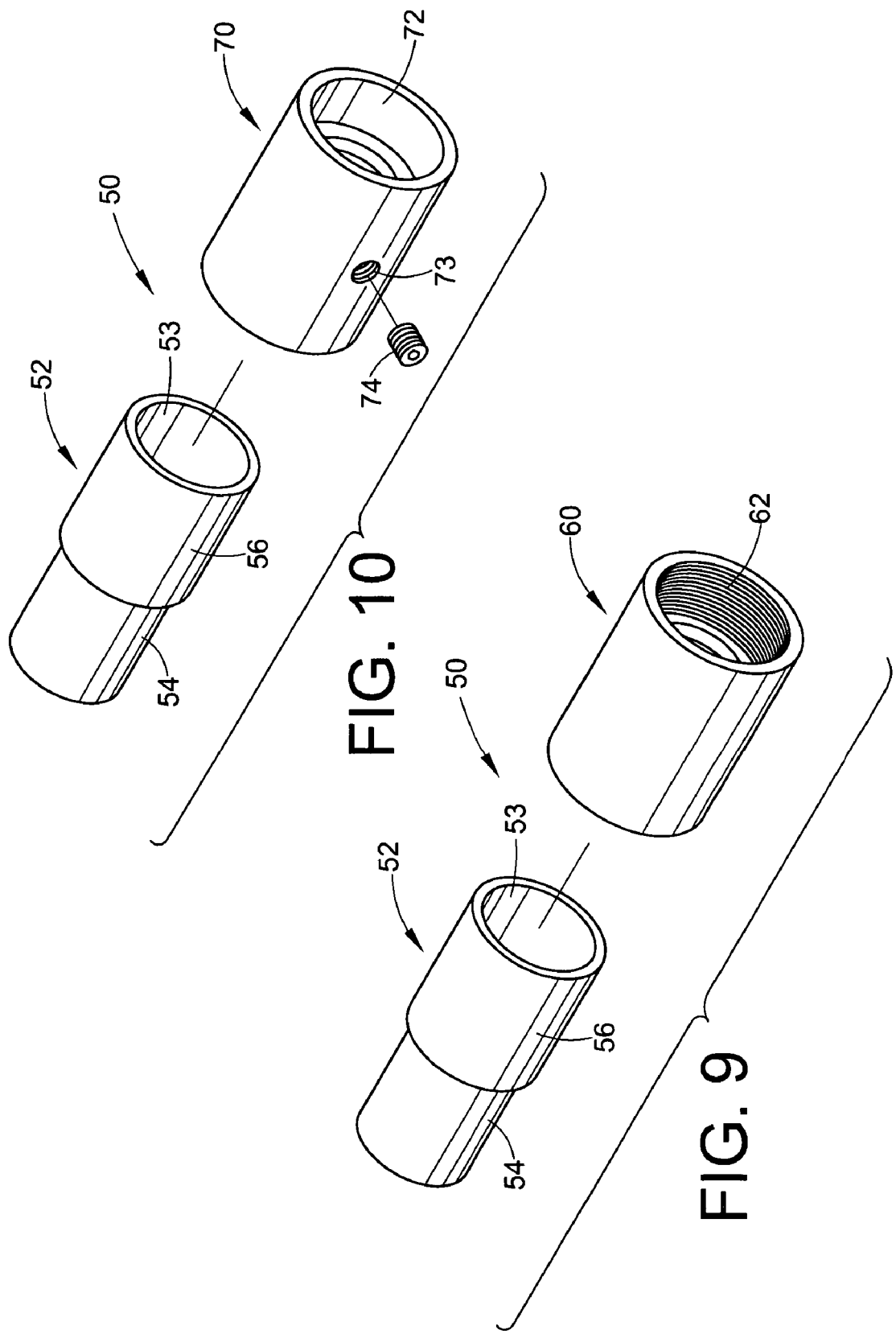

REAMING TOOL FOR BROKEN CONDUIT

REFERENCE TO RELATED APPLICATIONS

This application is a division of U.S. Ser. No. 10/610,042 filed Jun. 30, 2003 now U.S. Pat. No. 7,438,324.

BACKGROUND OF THE INVENTION

This invention relates to a unique reaming tool bit for use in repairing broken conduit.

Electrical conduit is often embedded in concrete foundations and floors of commercial and residential buildings, so that electrical wiring can be run at a later time. Since concrete foundations and floor are poured before any internal walls and other structures are erected, short sections of conduits extend vertically above the foundation and floor at every location of an electrical source. In large construction projects, there may be hundreds of exposed conduit ends extending from the concrete foundation and floors. In the course of construction, these exposed ends of the electrical conduit are often broken off by workers and equipment in the course of moving materials, erecting interior walls and other construction activities. The broken conduit ends must be repaired so that additional sections of conduit can be connected to them to complete the installation of the electrical systems.

More often than not, the conduit breaks off near the foundation. Consequently, repairing the broken conduit requires breaking up the foundation around the broken conduit end to expose the end so that a coupling can be attached over it. Once the coupling is connected to the exposed broken end, the concrete foundation is patched around the repaired conduit.

Repairing the broken conduit embedded in a concrete foundation is an expensive and time consuming project. A large construction site may have hundreds of exposed conduit ends broken over the course of the construction project. Repairing broken conduit ends is a time consuming expense that is not factored into the cost of most construction projects. Consequently, a method for quickly and easily repairing broken conduit ends is needed.

SUMMARY OF THE INVENTION

The method and specialized repair component for repairing broken conduit ends of this invention eliminates the need to break up the concrete foundation around the broken conduit end. The specialized repair components include a reaming bit for milling out and turning down the inside wall of the broken conduit end and repair couplings for joining a new section of conduit to the broken conduit end. The reaming bit is designed to be used with any conventional handheld power drill. The reaming bit mills out the inside of the broken conduit end so that the repair coupling can be inserted into the broken conduit end. With the coupling fitted into the broken conduit end, a new section of conduit can be connected completing the repair. Because the coupling is inserted into the broken end of the conduit instead of over it, the concrete foundation around the conduit does not have to be disturbed. Consequently, this repair method provides a structurally more secure repair.

Accordingly, an advantage of this invention is that the method eliminates the need to breakup concrete foundations surrounding the broken conduit end, which greatly reduces the time and expense of the repair.

Another advantage of this invention is that the repair method provides a more structurally secure repair because the concrete foundation remains undisturbed.

Another advantage of this invention is that the repair method requires only two specialized repair components: a reaming bit and a repair coupling.

Another advantage of this invention is that the reaming bit is designed to be used in any conventional handheld power drill, which is common and readily available at any construction site.

Another advantage of this invention is that a single user in only a few minutes can prepare a large number of broken conduit ends for repair, turning down the inside walls of the conduit with the drill mounted reaming bit.

Other advantages will become apparent upon a reading of the following description.

BRIEF DESCRIPTION OF THE DRAWINGS

A preferred embodiment of the invention has been depicted for illustrative purposes only wherein:

FIG. 1 is a perspective view of the reaming bit used in the repair method of this invention;

FIG. 2 is an elevated side view of the reaming bit of FIG. 1;

FIG. 3 is an end view of the reaming tool bit of FIG. 1;

FIG. 5 is a side view of the reaming tool bit mounted to the chuck of a conventional hand drill being inserted into a broken conduit end embedded in a concrete foundation (shown as a partial side sectional view);

FIG. 6 is a side view of the reaming tool bit mounted to the chuck of a conventional hand drill being withdrawn from the broken conduit end embedded in a concrete foundation showing the bored out inner wall of the broken conduit end (shown as a partial side sectional view);

FIG. 7. is a side sectional view of one embodiment of the repair coupling of this invention being inserted into the bored out broken conduit end;

FIG. 8 is a side sectional view of the repair coupling of FIG. 7 connecting the repaired conduit end and a new section of conduit;

FIG. 9 is an exploded perspective view of a second embodiment of the repair coupling of this invention;

FIG. 10 is an exploded perspective view of a third embodiment of the repair coupling of this invention;

DESCRIPTION OF THE PREFERRED EMBODIMENT

Figure 4:
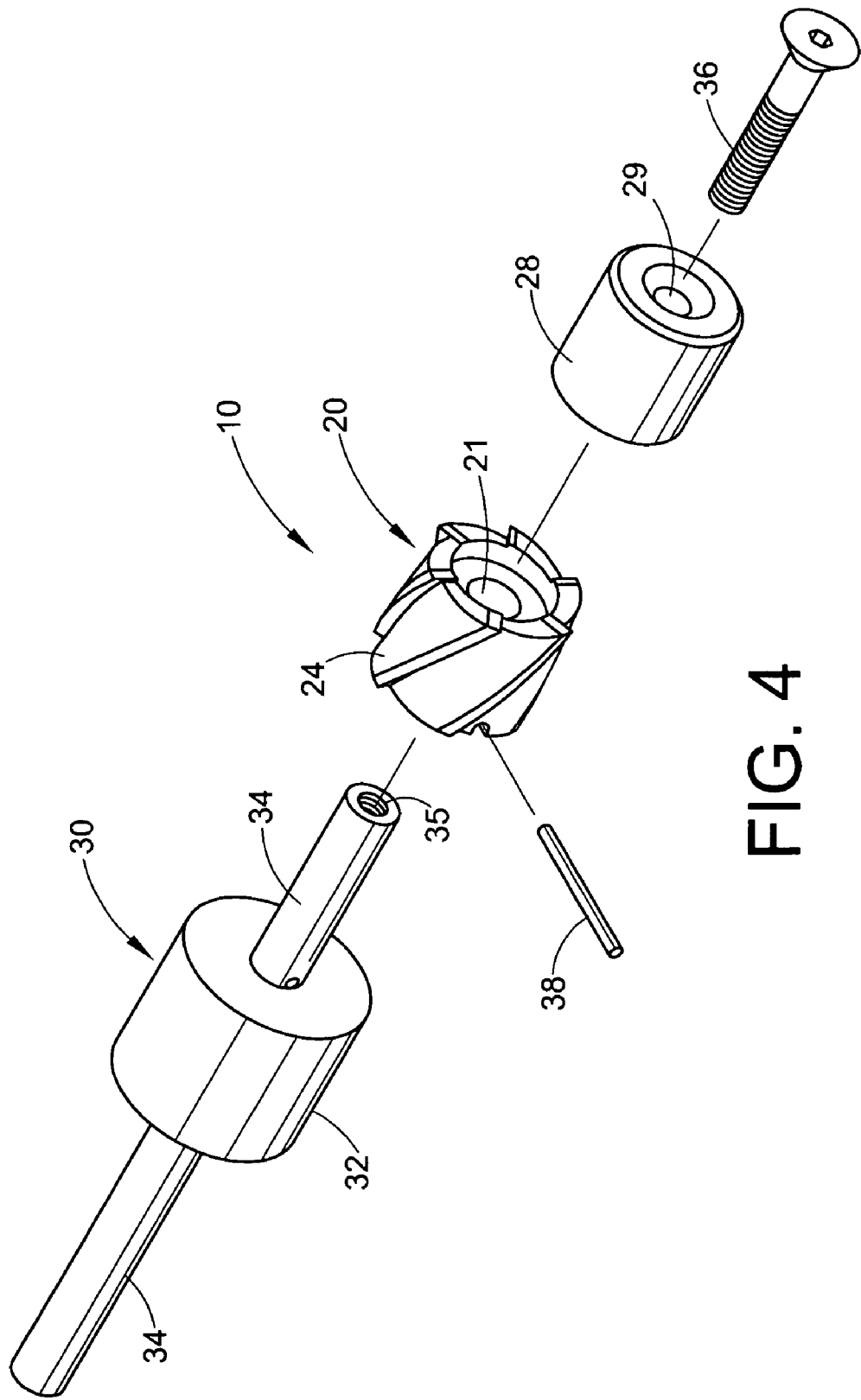
FIG. 4 is an exploded view of the reaming tool of FIG. 1.

The preferred embodiment herein described is not intended to be exhaustive or to limit the invention to the precise form disclosed. It is chosen and described to best explain the invention so that others skilled in the art might utilize its teachings. This invention entails a method of repairing broken electrical conduit embedded in a concrete foundation without breaking up the foundation and the specialized components used in the repair, namely, a reaming bit and various embodiments of a repair coupling.

FIGS. 1-4 illustrate the specialized reaming bit of this invention (designated generally as reference numeral 10), which is used to bore out the inner wall of the broken conduit end. Reaming bit 10 has a conventional design and construction common for drill and milling tools and is intended for use with hand held power drills (reference numeral 8 in FIGS. 5 and 6). As shown, reaming bit 10 includes an interchangeable cutting head 20 and pilot head 28 mounted on a mandrel 30. It should be noted that the reaming bit could also be machined from a solid piece of metal stock (not illustrated in the figures) within the teaching of this invention. The multiple piece design allows interchangeable cutting heads of various sizes to be used with a standard mandrel assembly.

As shown in FIGS. 1-4, cutting head 20 has a cylindrical body 22 and six helical cutting blades 24. Cutting head 20 also has an axial through bore 21, through which the mandrel extends. Each cutting blade has a cutting edge and a cutting face that allows the material shaved from the conduit wall to be expelled upward. The outer diameter of cutting head 20 is sized to mill out and remove material from the inner wall of the broken conduit end to reduce the wall thickness to accommodate the repair coupling. Generally, cutting head 20 is sized to remove approximately one half the thickness of the conduit wall. Pilot head 28 has an axial through bore 29, through which mandrel 30 extends. Mandrel 30 has an integral cylindrical shoulder stop 32 and axial shank 34 that extends axially from opposite ends of the shoulder stop. As shown, cutting head 20 and pilot head 28 are mounted to the proximal end of shank 34 by a bolt 36 that is turned into a threaded axial bore 35 in shank 34. The distal end of shank 34 is used to secure the reaming bit to the chuck of a power drill. A pin 38 extends through lateral bores in cutting head 20 and shank 34 to secure and prevent the cutting head from turning on the mandrel. The outer diameter of the pilot head 28 and shoulder stop 32 are sized to accommodate the inner and outer diameters of the broken conduit end, such that the pilot head is insertable into the broken conduit end and the oversized shoulder stop will abut against the conduit end.

FIGS. 7-14 illustrate different embodiments of the repair couplings of this invention, which are used to join the broken conduit end to a new section of conduit. The repair couplings join the broken conduit ends to new sections of conduit. Because electrical conduit is available in various standardized diameter sizes and wall thicknesses, the repair couplings of this invention are intended to be dimensioned into standardized sizes that accommodate the various diameter sizes and conventions of both plastic and metal electrical conduit. For example, different sizes of repair couplings will be used with each standardized diameter of the electrical conduit, i.e. 1 inch, ¾ inch, etc . . . . In addition, the teachings of this invention encompass variations in the repair coupling that will connect conduit of both identical (straight couplings) and differing diameter sizes (reducer couplings).

FIGS. 7 and 8 illustrate the repair coupling of this invention designated by reference numeral 40. Repair coupling 40 has a single piece construction and is ideally formed from a plastic material, such as acrylonitrile-butadiene-styrene (ABS) or polyvinylchloride (PVC), but can also be cast from a metal such as brass, aluminum or steel. Repair coupling 40 has a tubular body with a larger diameter female end 42 and a smaller diameter male end 44. Repair coupling 40 is dimensioned so that male end 44 can be inserted directly into the reamed conduit end with a snug fit and a new section of conduit can be inserted into the female end. As shown, the thickness the of sidewall of male end 44 are significantly thinner than the sidewall of female end 42, and is approximately one half the thickness of the sidewall of the reamed conduit end in which it is inserted. For a ¾ inch sized repair coupling, the sidewall thickness at male end 44 is approximately 0.0640-0.0700 inches (generally ranging between 0.0600-0.0700 inches) and the sidewall thickness at the female end is approximately 0.1260 inches (generally ranging between 0.1200-0.1300 inches). For a one inch sized repair coupling, the sidewall thickness at male end 44 is approximately 0.0675 inches (generally ranging from 0.0670-0.0680 inches) and the sidewall thickness at the female end is approximately 0.1425 (generally ranging from 0.1400-0.1500 inches). The tubular sidewalls of repair coupling 40 form a cylindrical passage therethrough. As shown in FIG. 8, the inner diameter of female end 42 is slightly greater than the inner diameter of male end 44, which forms a shoulder 46. Shoulder 46 acts as a stop of the new conduit section.

Figure 12:
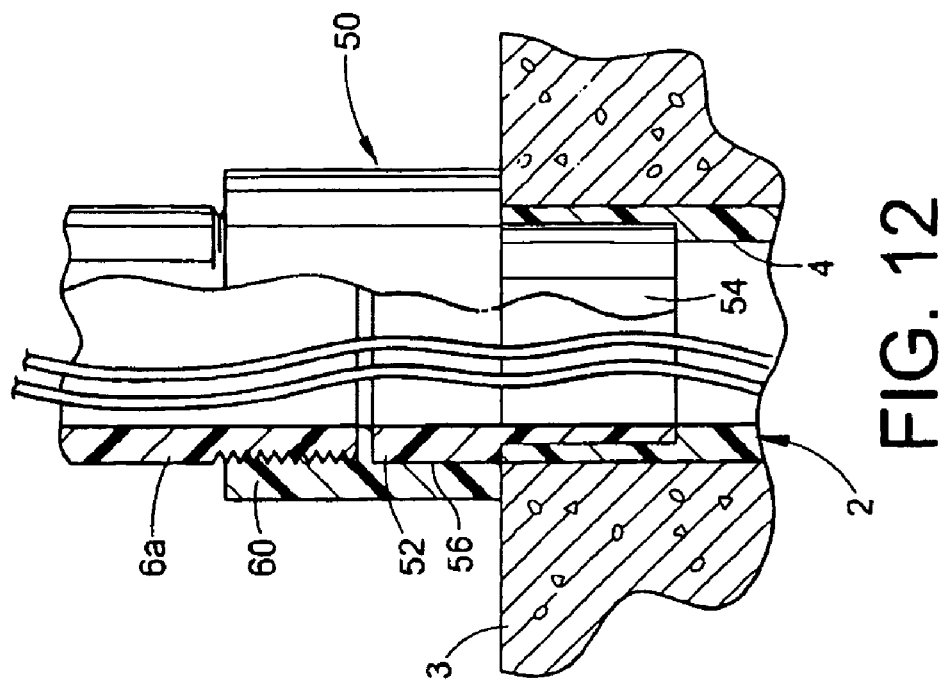
FIG. 12 is a side sectional view of the repair coupling of FIG. 9 connecting the repaired conduit end and a new section of conduit.
Figure 11:
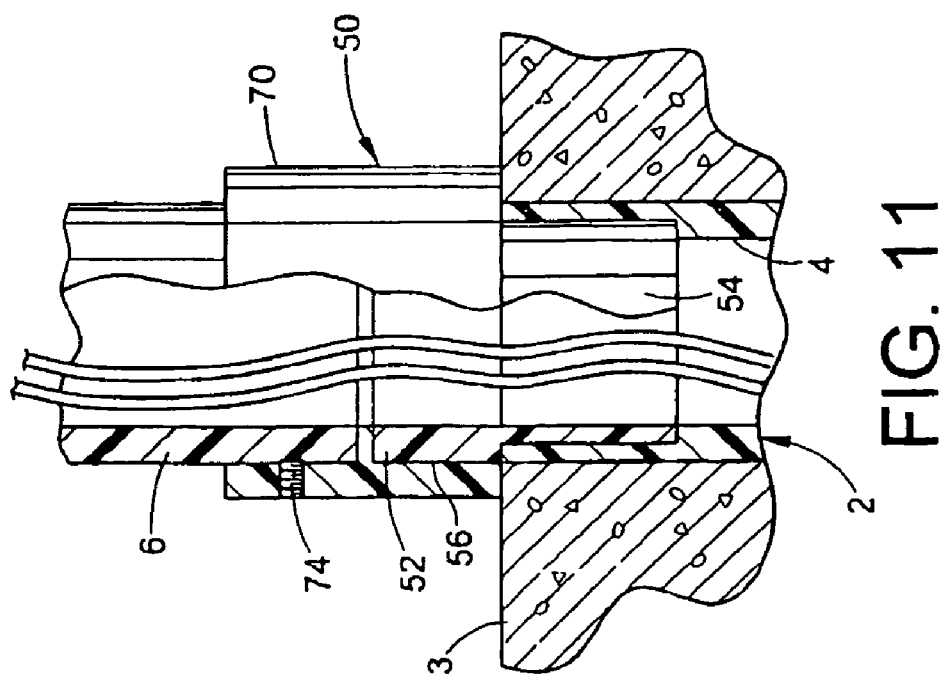
FIG. 11 is a side sectional view of the repair coupling of FIG. 10 connecting the repaired conduit end and a new section of conduit.

FIGS. 9-12 illustrate another embodiment of the repair coupling of this invention (designated as reference numeral 50). Repair coupling 50 has a two piece component design that includes an inner sleeve 52 and an outer collar (designated as 60 in FIGS. 9 and 12 and 70 in FIGS. 10 and 11). Both the inner sleeve 52 and outer collar 60 and 70 may be formed from a plastic material, such as acrylonitrile-butadiene-styrene (ABS) or polyvinylichlioride (PVC), or cast from a metal such as brass, aluminum or steel. Again, repair coupling 50 is intended to be sized and dimensioned into standardize sizes that accommodate the various diameter sizes and conventions of both plastic and metal electrical conduit. Generally, inner sleeve 52 is constructed of plastic and outer collars 60 and 70 are constructed of metal and is a conventional conduit connector of standard size. Inner sleeve 52 has a generally tubular body with a smooth axial bore 53. As shown in FIGS. 11 and 12, one end 54 of sleeve 52 is dimensioned for insertion into the reamed conduit end while the other end 56 is dimensioned for insertion into one end of outer collar 60 or 70. As shown, outer collars 60 and 70 differ only in that collar 60 has a threaded mouth 62 for receiving threaded electrical conduit 6a (FIG. 12), while collar 70 has a smooth mouth 72 for receiving non-threaded conduit 6 (FIG. 11), such as EMT (electrical metallic tubing). A small screw 74 is turned into a threaded side bore 73 in collar 70 to secure the new section of conduit into the collar.

FIGS. 5-12 illustrate the various steps in the method of this invention for repairing the broken conduit end designated generally as reference numeral 2 embedded in a concrete foundation 3. Often the broken conduit end extending from the concrete foundation is jagged and uneven and may extend some distance above the foundation. Initially, broken conduit end 3 is often cut at the surface of foundation 3 to provide a clean and straight end for repair, as shown in FIG. 5. As illustrated in FIGS. 5 and 6, reaming bit 10 is used to mill out the inside of the broken conduit end 2. Pilot head 28 guides and centers cutting head 20 as a user inserts reaming bit 10 into broken conduit end 2. The user inserts reaming bit 10 into the broken conduit end until shoulder stop 32 abuts the end of the conduit, whereby the rotating cutting head 20 reams out the inside of sidewall 4 to reduce the thickness of the conduit sidewall to a set depth substantially equal to the length of the cutting head. When reaming bit 10 is withdrawn from broken conduit end 2, the inside of conduit sidewall 4 has been reamed out (turned down) to receive the repair coupling. Next, the repair coupling is fitted to the reamed conduit end 2 (FIGS. 6 and 7). Typically, the male end of the repair coupling is hand pressed into the reamed conduit end and a joint compound is used to permanently join the repair coupling to the conduit. The last step, illustrated in FIGS. 8, 11 and 12 is to connect a new section of conduit designated as reference numeral 6 in FIGS. 8 and 11, and as 6a in FIG. 12 to the repair coupling. Again a joint compound is typically used to join the new conduit section 6 while conduit section 6a is joined by way of cooperating threads. Once the new conduit section is joined, wiring can be run within the repaired conduit system.

ADVANTAGES

One skilled in the art will note several advantages of this repair method and specialized repair components of this invention. The method eliminates the need to breakup concrete foundations surrounding the broken conduit end, which greatly reduces the time and expense of the repair. The repair method requires only the specialized reaming bit and a repair coupling. The reaming bit is deigned to be used in any conventional handheld power drill, which is common and readily available at any construction site. In a matter of minutes, a single user can prepare a large number of broken conduit ends for repair, turning down the inside walls of the conduit with the drill mounted reaming bit. The reaming bit is a relatively small component that can be carried by workers with little inconvenience. The repair method also does not require the repairer to carry any other additional tools.

The repair couplings are small, inexpensive piece parts, whose cost is significantly less than the cost of repairing a concrete foundation. The repair couplings are generally constructed from plastics and can be produced in various sizes in large quantities with great cost effectiveness. The single piece design of the first embodiment of the repair coupling is well suited for low cost plastic construction. The two piece design of the repair coupling of the second embodiment allows the combination of both plastic and metal conduit. Building codes often require metal conduit be run from the foundation up. Consequently, plastic conduit must often be mated with metal conduit at the foundation. The two piece design of the second embodiment allows plastic inner sleeves to be mated with plastic or metal collars. The repair coupling provides a convenient interconnection between the plastic conduit inside the foundation and metal conduit run above the foundation if required. In addition, the inner sleeves are designed to fit into conventional collars that are common and readily available in the industry further reducing costs.

It should be noted that the repair method of this invention also provides a more structurally secure repair. Patched concrete foundation never has the integrity of the original foundation and is subject to cracks, as well as an unsightly appearance. Consequently, eliminating the need to break up and patch the concrete foundations is a significant advantage of this repair method. While the inside of the sidewalls of the conduit are turned down, the concrete foundation, which is left undisturbed around the conduit end, provides sufficient structural support to the repair coupling and new conduit sections. Because the concrete foundation surrounds the broken conduit end, the turned down sidewall of the conduit is reinforced from outside forces that may fracture or crack the conduit.

It is understood that the above description does not limit the invention to the details given, but may be modified within the scope of the following claims.

I claim:

1. An apparatus for joining a new conduit to an embedded conduit having inner and outer diameters, the apparatus comprising:
   a mandrel including a cylindrical shoulder stop with a proximal end surface and a distal end surface, the mandrel further including a shank that is integral with the shoulder stop, the shank having a proximal end portion that projects axially from the proximal end surface of the shoulder stop and a distal end portion that is securable in a chuck and projects axially from the distal end surface of the shoulder stop;
   a cylindrical cutting head having an outer diameter between the inner and outer diameters of the embedded conduit, and further having a proximal end surface, a distal end surface, and an axial through bore for mounting the cutting head on the mandrel in an installed position in which the proximal end portion of the shank extends through the bore and the distal end surface of the cutting head abuts the proximal end surface of the shoulder stop; and
   a pilot head having an outer diameter matching the inner diameter of the conduit, and further having a distal end surface and an axial through bore for mounting the pilot head on the mandrel in an installed position in which the distal end surface of the pilot head abuts the proximal end surface of the cutting head.

2. An apparatus as defined in claim 1 further comprising a tubular coupling having a male section with an outer diameter matching the outer diameter of the cutting head so as to take an installed position fitted closely within a socket formed in the embedded conduit by the cutting head, and having a female section with an inner diameter sized for the new conduit to take an installed position fitted closely within the female section of the coupling.

3. An apparatus for joining a new conduit to an embedded conduit having inner and outer diameters, the apparatus comprising:
   a mandrel including a cylindrical shoulder stop with a proximal end surface and a distal end surface, the mandrel further including a shank having a proximal end portion that projects axially from the proximal end surface of the shoulder stop and a distal end portion that is securable in a chuck and projects axially from the distal end surface of the shoulder stop;
   a cylindrical cutting head having an outer diameter between the inner and outer diameters of the embedded conduit, and further having a proximal end surface, a distal end surface, and an axial through bore for mounting the cutting head on the mandrel in an installed position in which the proximal end portion of the shank extends through the bore and the distal end surface of the cutting head abuts the proximal end surface of the shoulder stop; and
   a pilot head having an outer diameter matching the inner diameter of the conduit, and further having a distal end surface and an axial through bore for mounting the pilot head on the mandrel in an installed position in which the distal end surface of the pilot head abuts the proximal end surface of the cutting head;
   wherein the cutting head and the pilot head are located in their installed positions on the mandrel and are held in place by a screw threaded attachment.

* * * * *